Figure 1:
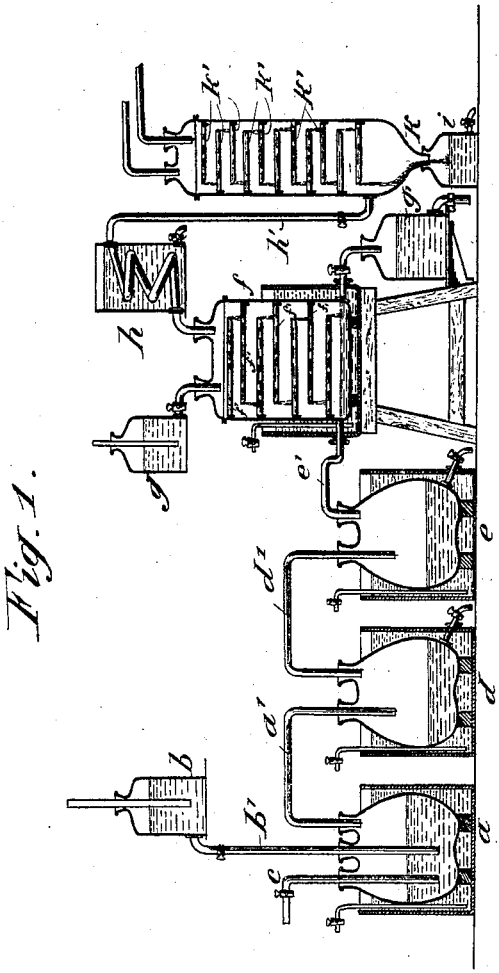

No. 774,151. PATENTED NOV. 8, 1904.
J. A. BESSON.
PROCESS OF CONTINUOUSLY PRODUCING AND RECTIFYING CHLORAL.
APPLICATION FILED OCT. 1, 1900.
NO MODEL. 3 SHEETS—SHEET 1.

No. 774,151. PATENTED NOV. 8, 1904.
J. A. BESSON.
PROCESS OF CONTINUOUSLY PRODUCING AND RECTIFYING CHLORAL.
APPLICATION FILED OCT. 1, 1900.
NO MODEL. 3 SHEETS—SHEET 2.

Witnesses:
J. D. McMahon.
L. M. Shireman.

Inventor,
Jules Adolphe Besson
by B. Singer,
Att'y.

No. 774,151. PATENTED NOV. 8, 1904.
J. A. BESSON.
PROCESS OF CONTINUOUSLY PRODUCING AND RECTIFYING CHLORAL.
APPLICATION FILED OCT. 1, 1900.
NO MODEL. 3 SHEETS—SHEET 3.

No. 774,151.

Patented November 8, 1904.

UNITED STATES PATENT OFFICE.

JULES ADOLPHE BESSON, OF CAEN, FRANCE.

PROCESS OF CONTINUOUSLY PRODUCING AND RECTIFYING CHLORAL.

SPECIFICATION forming part of Letters Patent No. 774,151, dated November 8, 1904.

Application filed October 1, 1900. Serial No. 31,669. (No specimens.)

*To all whom it may concern:*

Be it known that I, JULES ADOLPHE BESSON, a citizen of the Republic of France, and a resident of Caen, France, have invented certain new and useful Improvements in Processes of Continuously Producing and Rectifying Chloral, of which the following is a specification.

The primary object of my present invention is to provide an improved process of continuously producing chloral, ($CCl_3CHO$.)

The leading feature of the novel process is the fact that when chlorin acts on concentrated alcohol the chloral and its hydrate are the most volatile products contained in the original liquid, and these products may therefore be removed from the mother liquid by distillation continuously and as rapidly as they are evolved.

The production of chloral by the action of chlorin gas on concentrated alcohol is known; but as carried on so far it has been attended with serious inconveniences and defects, particularly in the frequent interruptions of the process. The presence of the products of reaction in contact with the unchlorinated alcohol paralyzed the power of the latter to take up more chlorin, causing stoppage of the reaction. To remedy this, the alcohol, which at the commencement of the process was cold, was gradually heated to increase its absorption power, or more properly to drive off the products and to produce the alcohol fumes, which are more readily combined with chlorin. No means were devised to readily carry away the reaction products. Besides, there was danger of continuing the addition of chlorin beyond a period of safety. In the known process the chlorin was admitted in as nearly dry a condition as possible. Then, again, final rectification of the chloral had to be performed in a separate apparatus, necessitating an interruption of the process. Besides, the final product was always rendered impure by the presence of ethyl ether, $(C_2H_5)_2O$, formed by heating the chlorination products, which always contained alcohol and chloral alcoholate.

In the present invention the vapors of previously-chlorinated alcohol are mingled with moist chlorin gas, whereby any chloral alcoholate which may have resulted from the previous chlorination of the alcohol is decomposed, so that the products which are subjected to the sulfuric-acid treatment consists of chloral and chloral hydrate only, all the alcohol having been eliminated by again treating it with chlorin during the distillation stage of the process. There are thus two separate treatments of alcohol by chlorin, and these are characteristic of the process.

This process may be carried into practical effect by means of the apparatus shown in the accompanying drawings.

Figure 2:
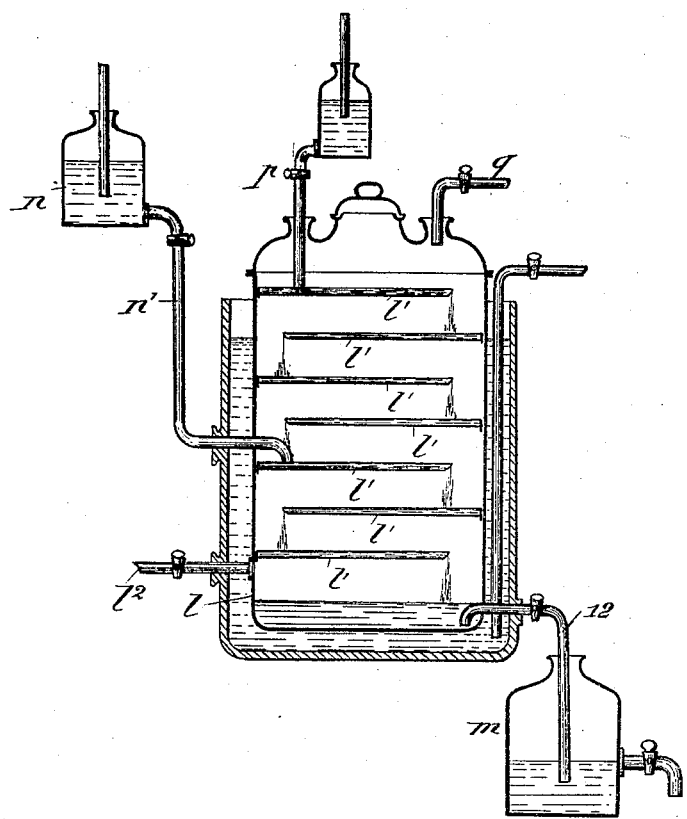
Figure 3:
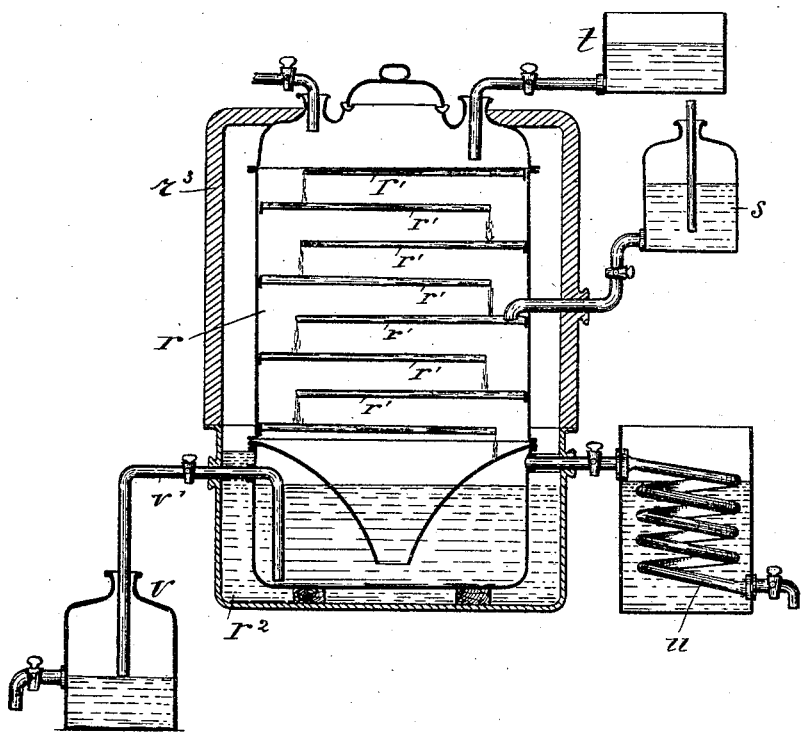

Figure 1 is a diagram showing the general arrangement of my apparatus. Fig. 2 shows a modification of the boiling-reservoir shown in Fig. 1. Fig. 3 shows the continuously-working rectifier.

Referring by letters to the drawings, and particularly to Fig. 1, $a$ represents the distilling recipient, heated by means of a water-bath, as shown, and receiving chlorinated alcohol from a reservoir $b$ through a pipe $b'$ and moist chlorin through a pipe $c$. Said recipient is connected, by means of a pipe $a'$, to a second reservoir $d$, connected, by means of a pipe $d'$, to a third reservoir $e$, said two reservoirs serving to condense the chloral vapors, the surplus of chlorin which is not absorbed being caught in the reservoir $f$, the bottom part of which is connected to the reservoir $e$ by means of a pipe $e'$. Said reservoir $f$ is provided internally with a series of staggered plates $f'$ $f'$ $f''$, over which alcohol coming from a reservoir $g$ flows, which absorbs the surplus of chlorin to form chlorinated alcohol, the latter being collected in a reservoir $g'$, from which it is brought to the above-named reservoir $b$.

At the beginning of the chlorination of alcohol alcoholate of chloral is formed. Then as the chlorination proceeds chlorated acetals are produced, and it is in the decomposition of the trichlorated acetal, $CCl_3CH(OC_2H_5)_2$, that the humidity of the chlorin intervenes, facilitating its decomposition into chloral and alcohol which is chlorinated in the vaporous state in the atmosphere of chlorin. The surplus of vapors are condensed in a coil-pipe $h$, surrounded by cold water and connected with a cylinder $k$, provided with a series of staggered plates $k'$ $k'$ $k'$, over which flows an alcoholic solution saturated with calcium chlorid, serving to absorb the non-condensed vapors collected in a reservoir.

The intervention of the humidity of the chlorin reacts to facilitate the complete chlorination of the chlorinated alcohol. The humidity exercises its action on the trichlorinated acetal, as well as on the alcoholate of chloral which may still exist in the chlorinated alcohol, to decompose them into chloral (or hydrate of chloral if the amount of humidity is sufficient) and into alcohol susceptible of a fresh chlorination, and this according to the following equations:

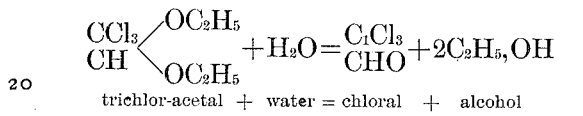

trichlor-acetal + water = chloral + alcohol

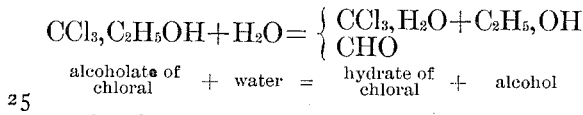

alcoholate of chloral + water = hydrate of chloral + alcohol

The difficulty of completely chlorinating the alcohol in the usual process arises in the mother liquid. It tends to immobilize still more the excess of alcohol in the combined state—trichlorinated acetal or alcoholate of chloral. In my process by distillation I eliminate the chloral according as it is formed, starting from the chlorinated alcohol, which sets the alcohol free and permits a much more complete and rapid chlorination of the alcohol. The humidity of the chlorin intervenes to facilitate the liberation of the chloral and to permit of its elimination.

In certain cases the first reservoir $a$ may be replaced by a reservoir $l$, such as is shown in Fig. 2, provided with a series of staggered plates $l'$ $l'$ $l'$ and receiving at about its middle part chlorinated alcohol flowing from a reservoir $n$ through a pipe $n'$, the upper part of said reservoir $l$ being supplied by a reservoir $p$, containing the product collected in the lower receptacle $m$. Chlorin is admitted through the pipe 12, while the chlorinated product escapes through the pipe $q$.

All the parts of my apparatus are made of lead, clay, glass, enameled metal, or any suitable material which cannot be influenced by chlorin.

Fig. 3 of the accompanying drawings shows the continuously-operating rectifier, which may be combined with the apparatus above described. It comprises a reservoir $r$, provided with a series of staggered plates $r'$ $r'$ $r'$ and supplied at about its middle part with chloral contained in a reservoir $s$ and at its top part with sulfuric acid at 66° Baumé contained in a reservoir $t$. Said reservoir is seated in paraffin $r^2$ and surrounded by an outer casing $r^3$. The anhydrous chloral is distilled with chlorhydric gas and passed into a coil-pipe $u$, while the acid after its action on the chloral passes through an overflow $v'$ into a reservoir $v$. The final purification may be effected in the usual way by distillation of the product in contact with chalk or bicarbonate of soda.

The apparatus I have described may also be employed for converting anhydrous chloral into chloroform for use in surgery.

In this case the reservoir $r$ is supplied at about its middle part with anhydrous chloral and at its top part with alkaline liquid, such as a solution of soda, baryta, &c.

Having fully described my invention, what I claim, and desire to secure by Letters Patent, is—

1. The continuous process of producing and rectifying chloral, which consists in primarily heating moist chlorin and chlorinated alcohol in a common vessel, causing the volatile products to be condensed successively, and distilling the final product with sulfuric acid, substantially as set forth.

2. The continuous process of producing and purifying chloral, consisting in primarily heating continuously-fed moist chlorin and chlorinated alcohol in a common vessel, causing the volatile products to be condensed successively, utilizing the surplus chlorin to produce chlorinated alcohol, returning said chlorinated alcohol to said common vessel, and distilling the final product, with sulfuric acid, substantially as set forth.

3. The continuous process of rapidly producing and rectifying chloral, which consists in heating moist chlorin and chlorinated alcohol in a common vessel, causing the volatile products to be condensed successively, and distilling the final product with sulfuric acid and purifying the distilled chloral by means of bicarbonate of soda, substantially as set forth.

4. The process which consists in first subjecting alcohol to the action of chlorin gas to produce chlorinated alcohol, then distilling the chlorinated alcohol in the presence of moist chlorin gas and condensing the products of such distillation.

In testimony whereof I have hereunto set my hand in presence of two witnesses.

JULES ADOLPHE BESSON.

Witnesses:
ADOLPHE STURM,
EDWARD P. MACLEAN.